Patented Sept. 23, 1941

2,256,463

UNITED STATES PATENT OFFICE

2,256,463

SPEED REGULATING SYSTEM

Ernst F. W. Alexanderson, Schenectady, N. Y., assignor to General Electric Company, a corporation of New York Application July 20, 1940, Serial No. 346,583

26 Claims. (Cl. 290—4)

This invention relates to improvements in electrical regulating systems and more particularly to speed regulating systems for multiple unit power plants.

This is a continuation-in-part of my application Serial No. 321,754, filed March 1, 1940, and assigned to the assignee of the present application.

In multiple unit power plants a given total load is shared by a plurality of relatively small size power plants. Such multiple unit systems are flexible and economical and their field of application is increasing. For example, multi-engine aircraft are increasing and also the number of engines used on each aircraft is increasing. Similarly, in ship propulsion the use of as many as eighty Diesel-electric power plants in a single ship is being given serious consideration. These units will be widely separated so as to improve the weight distribution and, in war ships, the protection against total disablement by a single hit from a shell or bomb. In most multiple unit systems it is desirable to adjust the speed over a relatively wide range, such for example as 4:1, and at the same time maintain the speed at any particular adjusted value substantially constant with changes in load. It is also desirable to maintain the load division between the units in a substantially fixed ratio over a wide variation in speed and load.

These requirements have constituted a difficult technical problem. In conventional centrifugal speed governors the controlling forces vary in accordance with the square of the speed so that over a 4:1 speed range the variation in controlling forces is 16:1 and this range of controlling forces has been found to be too wide to result in reliable and satisfactory operation from the standpoints of both speed regulation and load division.

In accordance with this invention I provide a speed regulator having a master speed responsive element which by means of a high-speed, high-gain amplifier controls simultaneously the power inputs or power outputs of the various power units. The speed setting of the system is adjusted manually by directly varying the power inputs or power outputs of the power units simultaneously and at the same time adjusting the setting or calibration of the speed responsive element so that it will correspond to the speed of the units as determined by the manual setting of the power inputs to the units.

An object of the invention is to provide a new and improved regulating system.

Another object of the invention is to provide an automatic electrical speed regulating system for a multiple unit power plant.

A still further object of the invention is to provide a speed regulator for a multiple unit power plant in which the speed setting may be adjusted over a wide range.

The invention will be better understood from the following description taken in connection with the accompanying drawings and its scope will be pointed out in the appended claims.

Figure 1:
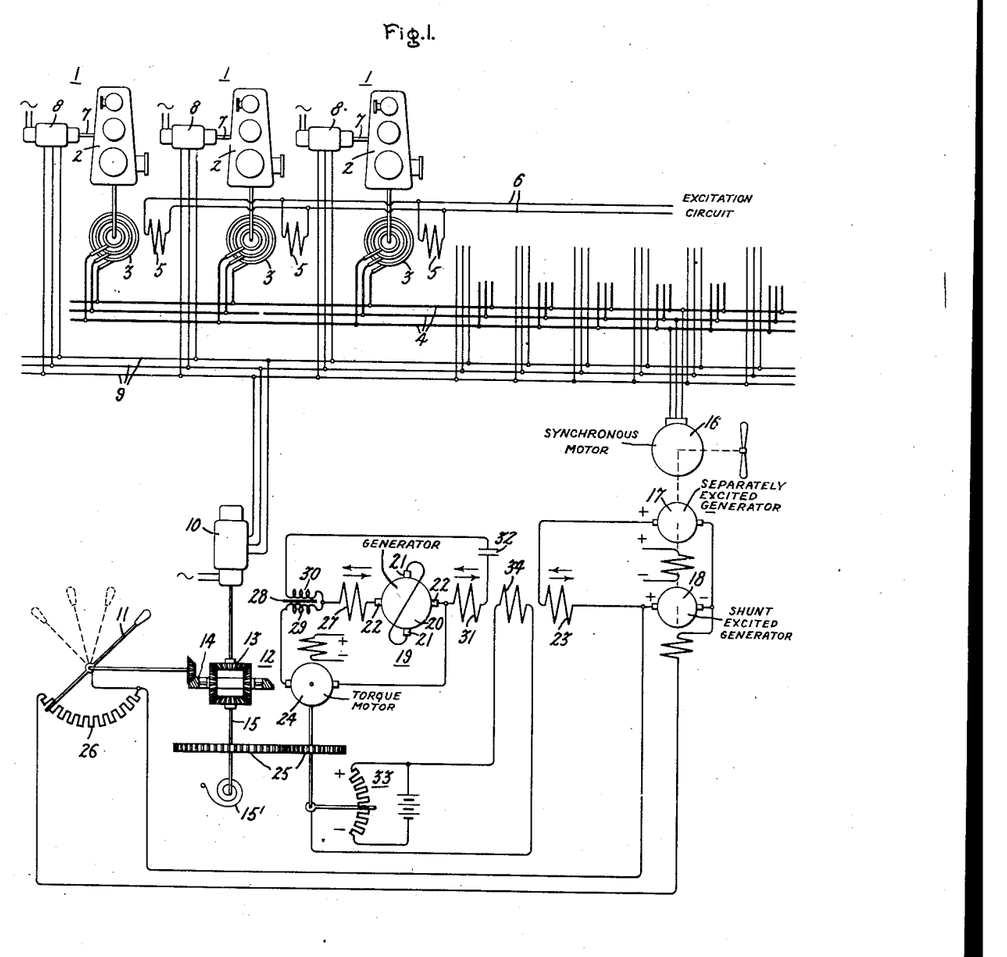
Fig. 1 illustrates diagrammatically an embodiment of the invention and Figs. 2 and 3 are similar illustrations of modifications thereof.

Referring now to the drawings and more particularly to Fig. 1, there is shown therein by way of example a plurality of Diesel-electric power plants 1 consisting of Diesel engines 2 and three-phase synchronous generators 3 connected in parallel to a load bus 4. This bus may be connected to any suitable load not shown, such for example as a motor for driving a ship's propeller. Each of the generators is provided with a field winding 5 connected to be energized from a common excitation circuit 6. For controlling their speeds each of the engines is provided with a throttle control 7. These individual throttle controls are arranged to be operated in unison from a remote point by any suitable means, such as by so-called self-synchronous receiver devices 8 all connected in parallel with each other by means of a bus 9 to which is connected a self-synchronous transmitter 10. These self-synchronous devices are well known in the art. They are similar to three-phase induction motors having single phase excited rotors. With this arrangement the rotors of all the receiver devices 8 maintain a fixed angular relation with the rotor of the transmitter device 10 and consequently they maintain fixed angular relations with each other so that any rotation of the rotor of the transmitter 10 causes all of the throttle controls to operate in unison to either increase or decrease the power and speed of the engines.

Although for the sake of simplicity only three units have been shown in detail, it will be understood that as many additional units as may be desired may be added to the buses 4 and 9.

The no-load speed setting of the units is controlled by a manually operated lever 11 which is connected through a mechanical differential 12 to the rotor of the self-synchronous transmitter 10. This differential mechanism has a driven member or gear 13 directly connected to the rotor of the transmitter 10 and has two driving members 14 and 15. The driving member 14 is directly connected to the manually adjusting manually operated lever 11. The driving member 15 is operated by the automatic speed regulating means which will now be described.

The automatic speed regulator consists essentially of adjustable means for detecting variations in speed from a predetermined value, amplifying means controlled by these detecting means and motor means controlled by the amplifier for driving the member 15 of the differential. The detecting means may be any one of a number of equivalent and well-known arrangements for this purpose. A simple and rugged arrangement of this kind which I have devised consists of a synchronous motor 16 connected to the bus 4 so as to produce a speed of rotation which is directly proportional to the speed of the Diesel electric unit 1. Motor 16 drives a pair of direct current pilot generators 17 and 18 whose armatures are connected in series with their polarities opposing each other. Generator 17 is separately excited and generator 18 is shunt excited. The excitations of generators 17 and 18 may be so adjusted that at any desired speed their voltages are equal and consequently their voltage difference will be zero. If now the speed changes the voltages of the two generators will not change at the same rate due to the difference in characteristics between self and separately excited machines. Consequently, a voltage difference which is proportional in magnitude to the deviation in speed will be produced and furthermore the polarity of this voltage difference will depend upon the sign of the change in speed.

For amplifying the reversible polarity voltage difference whose magnitude is proportional to speed deviations from a predetermined value I provide an amplifier in the form of a direct current generator 19. The details of a suitable form of amplifying generator are disclosed and claimed in my copending joint application with M. A. Edwards, Serial No. 281,003, filed June 24, 1939, and assigned to the assignee of the present application. It consists essentially of a conventional direct current dynamo electric machine armature and commutator 20 provided with a set of short circuited brushes 21 whose commutating axis is electrically in quadrature with the commutating axis of a set of load brushes 22. The main operating flux of the machine, that is to say, the flux which produces the generated E. M. F. between the load brushes 22, is produced by the armature reaction of the current flowing between the short circuited brushes. The resistance of the circulating path between the short circuited brushes is relatively low and the E. M. F. for producing the flow of relatively heavy short circuit current which produces the large cross armature reaction flux is produced by the relatively small M. M. F. of a control field winding 23 on the commutating axis of the load brushes. This control field winding is connected in circuit with the direct current pilot generators 17 and 18 so as to be energized by their potential difference.

Energized by the amplifier 19 is a reversible torque motor 24 of any suitable type. It is shown by way of example as a separately excited direct current motor whose brushes are connected in circuit with the load brushes 22. The shaft of the motor 24 is connected by suitable gearing 25 to rotate the driving member 15 of the differential.

In order to cause the voltages of the pilot generators 17 and 18 substantially to cancel each other at any particular speed as determined by the setting of the manually operable lever 11 the voltage of one of the pilot generators is also controlled by the lever 11. This may be done in any suitable manner and as shown a rheostat 26 operated by the lever 11 is connected in circuit with the shunt field winding of the pilot generator 18.

The operation of the system as thus far described is as follows. If the main synchronous generators 3 are not excited the speed of all of the units will be controlled directly by the member 11. The setting of this lever therefore fixes the no load speed of the units because when the generators 3 are not excited they are not delivering any power. If now these machines are excited and synchronized in the usual manner but if little or no load is placed on the bus 4 the voltage difference between the pilot generators 17 and 18 will be substantially zero by reason of the adjustment of the rheostat 26. Consequently, the amplifier 19 will produce substantially no output voltage and the torque motor 24 will produce substantially no torque tending to rotate the member 15 and change the throttle settings. If now a load is placed on the bus 4 the speed of the units will decrease thereby decreasing the frequency of the generators 3 and decreasing the speed of the synchronous motor 16. The polarity of the difference in voltage between the pilot generators produced by this decrease in speed will be such that the amplifying generator 19 will produce a voltage of such polarity as to cause the torque motor 24 to rotate the self-synchronous transmitter 10 in a direction to open the engine throttles and therefore increase their speed.

The amplifying generator 19 has a relatively low inductance and relatively low resistance so that very slight currents in its control field winding 23 cause relatively large voltages to be produced between its load brushes 22 very quickly. Consequently, the regulating system is very sensitive and quick acting.

If the speed increases for any reason above that determined by the setting of the lever 11 the polarity of the winding 23 will reverse thus reversing the polarity of the amplifying generator 19 which in turn reverse the torque of the motor 24 thereby to operate all of the throttles in a closing direction through the rotation of the differential 12 and the self-synchronous devices 10 and 9. The system is thus equally sensitive and fast in correcting for over-speed and under-speed.

For best operation a spring 15′ or other equivalent means should be provided for producing a torque which opposes the torque of the motor 24 and which torque increases when the throttles are moved in an opening direction. This inherently gives the automatic speed regulating system a slightly droopy speed characteristic with increases in load. This is often desirable but it can be reduced to an almost negligible amount by means of the extreme sensitivity of the speed deviation detecting means consisting of the two pilot generators when coupled with the very high amplification ratio of the generator 19. In other words, the system can readily be so proportioned that a speed deviation of but a fraction of a per cent will produce variations in torque of the motor 24 of 100 or more per cent.

This regulating system automatically "fails safe" because if there should be any failure in the automatic speed responsive equipment or any accidental loss of excitation on the main machines or any other accidental loss of load on the engines the speed of these engines cannot become higher than the no load speed setting which is determined by the position of the lever 11.

The load current of the amplifying generator 19 produces an armature reaction mmf. which opposes the mmf. of the control field 23. This, therefore, tends to cause the system to come to rest at a lower engine speed at high load than at light load. It thus results in a stabliliizng or antihunting action supplementing that produced by the action of the spring 15'. It, however, decreases the amplification ratio of the device so that if desired this load current demagnetizing effect can be neutralized to any desired extent by means of a series compensating field winding 27.

In some systems stabilizing or anti-hunting effects which are proportional to the first power of the regulating effect are not sufficient to prevent overshooting of the regulating system. In such cases the action of the regulator can be further stabilized by means which is responsive to the rate of change of the regulating force or effect. In a preferred form this rate of change responsive anti-hunting effect is produced by a transformer 28 having what may be called a primary winding 29 connected to carry the load current of the amplifying generator and having what may be called a secondary winding 30 connected to supply current to an anti-hunting winding 31 on the generator 19. The return circuit for this winding is shown as through the generator armature but obviously a separate return conductor may be employed if desired. Winding 31 is preferably on the same magnetic axis as the control winding 23 and the series winding 27. In order to increase the speed of action of this rate of change responsive anti-hunting means the inductance of the secondary circuit may be neutralized by a series capacitor 32 if desired. The instantaneous polarity of the secondary winding 30 is, of course, such that the mmf. of the anti-hunting winding 31 always opposes the control mmf. of the winding 23. This arrangement does not produce any under-compounding or drooping effect because during steady state conditions the load current of the amplifier 19 will be constant and thus no voltage will be induced in the secondary winding 30.

The quickness of action of the regulator may be further increased by a follow-up system whereby a voltage divider 33 driven by the torque motor 24 introduces a potential in an auxiliary field winding 34 of the amplifying generator which tends to lower the current in the motor circuit and thereby check the motion.

Figure 2:
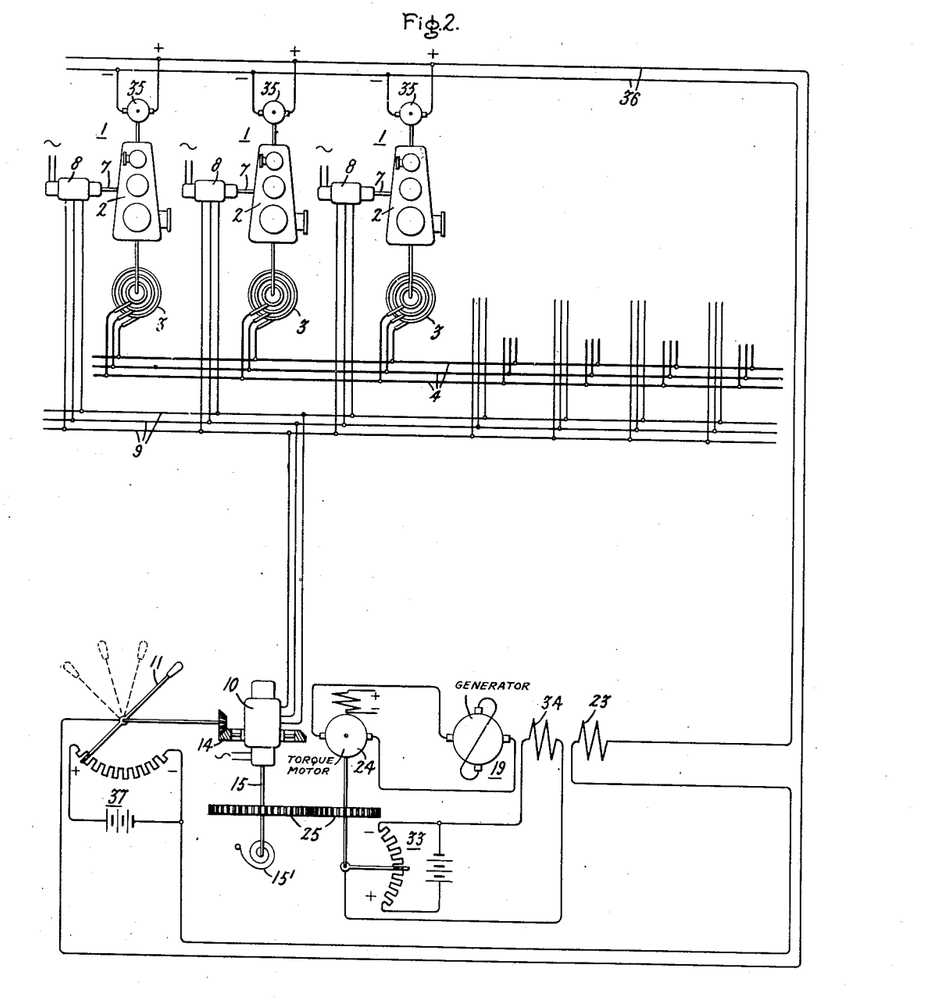

In Fig. 2 each engine 2 drives a pilot direct current generator 35. All these pilot generators are connected in parallel to a circuit 36. Thus, the voltage of this circuit indicates the average speed of all the engines. The hand control 11 drives a voltage divider 37 which establishes a direct current voltage proportional to the desired speed. This voltage is matched against the voltage of the pilot generators and the difference between these two voltages energizes the field 23 of the amplifying generator 19.

This arrangement has the advantage that the speed regulator functions even though the main generators are without field. Thus, direct hand control maintains the minimum fuel supply required to keep the engines idling at approximately the desired speed, and the speed regulator introduces the additional fuel supply needed to keep the engines from dropping below this speed when they are loaded, but also maintains this speed while the engines are idling.

The system is further simplified by using the Selsyn transmitter 10 as a differential Selsyn. This permits the elimination of the mechanical differential 12. As shown, the driving member 14 is arranged to rotate what is normally the stator of the transmitter and driving member 15 is arranged to rotate directly the rotor of transmitter 10. The Selsyn receivers are still rotated in accordance with the differential rotation of the driving members 14 and 15 so that these receivers constitute the driven means of the differential mechanism.

Figure 3:
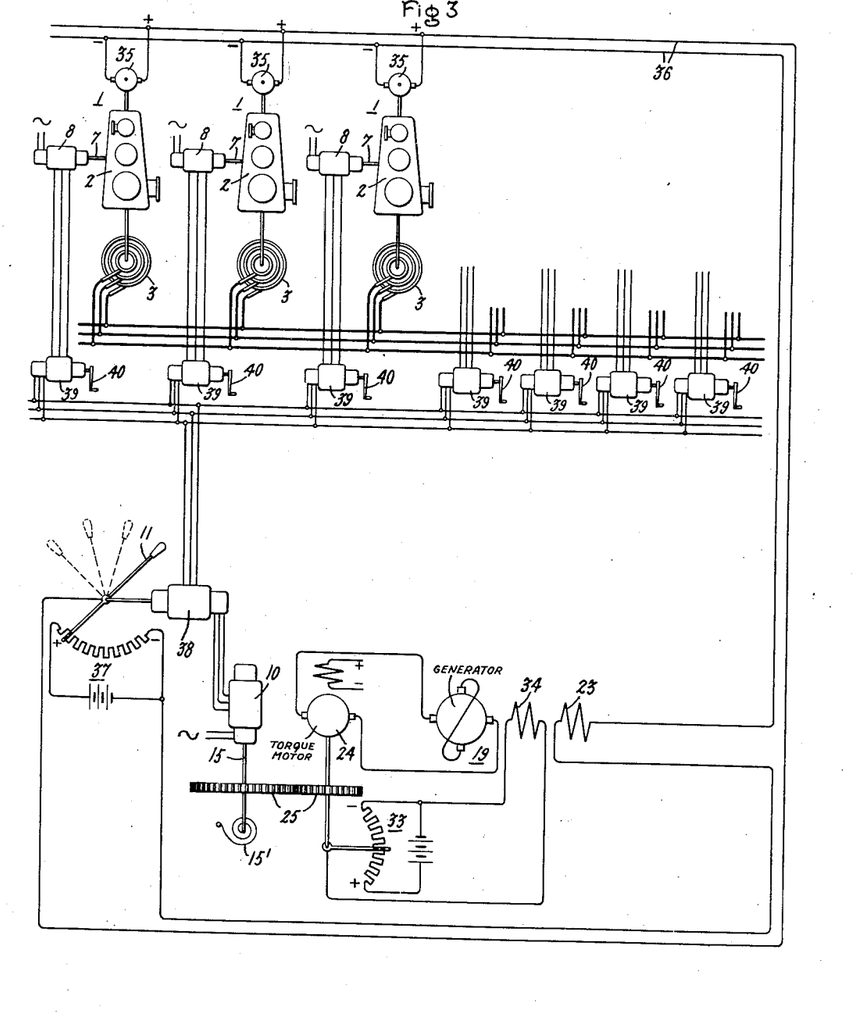

In Fig. 3 there is shown a further modified form of differential mechanism. In this form a phase shifter 38 is connected in the common or master polyphase control circuit in series with the master telemetric transmitter 10. The rotor of the transmitter 10 is operated directly by the automatic regulator as in Fig. 2 and the rotor of the device 38 is turned relative to its stator by the master or common manual controller 11. The stator of device 10 is stationary in this figure. Device 38 consists of a three-phase stator winding and a three-phase rotor winding so arranged that relative rotation therebetween shifts the phase angle between the voltages of circuits connected to these windings. In this manner the position of the individual telemetric receivers 8 is determined by the relative position of the rotors of the devices 10 and 38 so that these latter two devices constitute an electrical differential mechanism.

The individual branch circuits for the separate receivers 8 have connected therein near the points of connection thereof to the common control circuit individual phase shifters 39. Devices 39 are the same construction as the device 38 and their rotors are manually adjustable by any suitable means such as by means of handles 40. These devices are preferably grouped together on a control panel in the remote centralized control station containing the master manual speed setting adjuster 11. The operation of devices 39 is such that when their rotors are turned through given angles the receivers 8 will follow these angular changes, thereby adjusting the respective throttles of the prime movers and thus the distribution of load between the machines is varied.

The direct control and the speed regulator control are analogous to the hand control and the foot control on an automobile. In the case of the automobile it is observation and desire on the part of the driver that maintains the speed of the car through the foot control. This function is made automatic by the speed regulator, whereas the hand control in both cases maintains the desired idling speed of the engine. The special problem in the case of a ship's drive is the multiplicity of engines that must be maintained in synchronism and to properly divide their load over a wide range of speeds.

The system described above makes possible the maintenance of synchronism and the proper division of load between a multiplicity of engines over a wide speed range by removing all speed responses from the control of the individual engines and insures the division of load by accurately regulating the fuel supply to all the engines. If in spite of the equality of fuel supply, one engine should develop somewhat greater torque than another engine, this difference is easily taken up by the electrical synchronizing power and if one engine should miss fire or lose its torque entirely it will be kept idle without disturbance of the operation as a whole.

The loss of power of one engine will not disturb the function of the speed regulator which will only tend to maintain the speed by feeding more fuel to the other engines. If they are working, however, at full power the speed of the power plant will drop in accordance with the power characteristics of the load.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a plurality of prime movers connected to supply power to a common load, means responsive to the average speed of said prime movers for uniformly increasing the power delivered by each of said prime movers if said average speed falls below a predetermined value and for uniformly decreasing the power delivered by each of said prime movers if said average speed rises above said predetermined value, and means for adjusting the value of said predetermined average speed comprising a device for simultaneously changing the speed responsive setting of said means which is responsive to said average speed and uniformly changing the power delivered by each of said prime movers in such a manner that both the changes in average speed produced thereby correspond with each other.

2. An automatic speed regulating system for causing a plurality of prime movers to share a common load in a given ratio at any selected speed over an adjustable speed range of at least four to one comprising, in combination, a differential mechanism having a pair of rotatable driving members and driven means which is selectively rotatable by either driving member, means for simultaneously varying the power delivered by each of said prime movers in accordance with changes in the angular position of said driven means, manually operable means for rotating one of said driving members in order to adjust the speed of said prime movers, means responsive to departures of the speed of said prime movers from a predetermined value for rotating the other of said driving members in such direction as to restore the speed to said predetermined value, and means operated by said manual means for adjusting said predetermined speed to correspond to the manually adjusted speed setting.

3. An automatic speed regulating system for causing a plurality of prime movers to share a common load in a given ratio at any selected speed over an adjustable speed range of at least four to one comprising, in combination, a differential mechanism having a pair of rotatable driving members and driven means which is selectively rotatable by either driving member, means for simultaneously varying the power delivered by each of said prime movers in accordance with changes in the angular position of said driven means, manually operable means for rotating one of said driving members in order to adjust the speed of said prime movers, separate electrically parallel connected alternating current generators driven respectively by said prime movers, means responsive to departures of the speed of said generators from a predetermined value for rotating the other of said driving members in such a direction as to restore the speed to said predetermined value, and means operated by said manual means for adjusting said predetermined speed to correspond to the manually adjusted speed setting.

4. An automatic speed regulating system for causing a plurality of prime movers to share a common load in a given ratio at any selected speed over an adjustable speed range of at least four to one comprising, in combination, a differential mechanism having a pair of rotatable driving members and driven means which is rotated by either driving member, means for simultaneously varying the power delivered by each of said prime movers in accordance with changes in the angular position of said driven means, manually operable means for rotating one of said driving members in order to adjust the no-load speed of said prime movers, means independent of the no-load speed of said prime movers but responsive to load-produced departures of the speed of said prime movers from a predetermined value for rotating the other of said driving members in such direction as to restore the speed to said predetermined value, and means operated by said manual means for adjusting said predetermined speed to correspond to the manually adjusted no-load speed setting.

5. An automatic speed regulating system for causing a plurality of prime movers to share a common load in a given ratio at any selected speed over an adjustable speed range of at least four to one comprising, in combination, a differential mechanism having a pair of rotatable driving members and driven means which is rotated by either driving member, means for simultaneously varying the power delivered by each of said prime movers in accordance with changes in the angular position of said driven means, manually operable means for rotating one of said driving members in order to adjust the speed of said prime movers, a plurality of parallel connected synchronous generators driven respectively by said prime movers, a synchronous pilot motor connected to the parallel circuit of said generators, means responsive to departures of the speed of said pilot motor from a predetermined value for rotating the other of said driving members in such direction as to restore the speed to said predetermined value, and means operated by said manual means for adjusting said predetermined speed to correspond to the manually adjusted speed setting.

6. An automatic speed regulating system for causing a plurality of prime movers to share a common load in a given ratio at any selected speed over an adjustable speed range of at least four to one comprising, in combination, a differential mechanism having a pair of rotatable driving members and driven means which is rotated by either driving member, means for simultaneously varying the power delivered by each of said prime movers in accordance with changes in the angular position of said driven means, manually operable means for rotating one of said driving members in order to adjust the speed of said prime movers, means responsive to departures of the average speed of said prime movers from a predetermined value for rotating the other of said driving members in such direction as to restore the speed to said predetermined value, and means operated by said manual means for adjusting said predetermined speed to correspond to the manually adjusted speed setting.

7. An automatic speed regulating system for causing a plurality of prime movers to share a common load in a given ratio at any selected speed over an adjustable speed range of at least four to one comprising, in combination, a differential mechanism having a pair of rotatable driving members and driven means which is rotated by either driving member, means for simultaneously varying the power delivered by each of said prime movers in accordance with changes in the angular position of said driven member, manually operable means for rotating one of said driving members in order to adjust the speed of said prime movers, a plurality of parallel connected synchronous generators driven respectively by said prime movers, separate parallel connected direct current pilot generators driven by each of said prime movers, means responsive to departures of the voltage of the parallel circuit of said pilot generators from a predetermined value for rotating the other of said driving members in such direction as to restore the speed to said predetermined value, and means operated by said manual means for adjusting said predetermined speed to correspond to the manually adjusted speed setting.

8. In an automatic speed regulating system for a rotary machine, means for producing a potential difference whose magnitude is proportional to the degree of departure of the speed of said machine from a predetermined value, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, and means for energizing said control field winding in accordance with said potential difference.

9. In an automatic speed regulating system for a rotary machine, means for producing a direct potential difference whose magnitude is proportional to the degree of departure of the speed of said machine from a predetermined value and whose polarity is dependent on the sign of said departure, means for adjusting the value of said predetermined speed at which said potential difference changes sign, means including a reversible torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, and means for energizing said control field winding in accordance with said potential difference.

10. In an automatic speed regulating system for a rotary machine, means for producing a direct potential difference whose magnitude is proportional to the degree of departure of the speed of said machine from a predetermined value, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, and anti-hunting means comprising a winding in series with the load brushes of said direct current generator arranged to send flux through the armature thereof in a direction parallel to the commutating axis of said load brushes.

11. In an automatic speed regulating system for a rotary machine, means for producing a direct potential difference whose magnitude is proportional to the degree of departure of the speed of said machine from a predetermined value, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, another field winding on said direct current generator arranged to send flux through the armature thereof parallel to the commutating axis of said load brushes, and means for energizing said other field winding in accordance with the rate of change of current through said load brushes.

12. In an automatic speed regulating system for a rotary machine, means for producing a direct potential difference whose magnitude is proportional to the degree of departure of the speed of said machine from a predetermined value, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, another field winding on said direct current generator for sending flux through the armature thereof in a direction parallel to the commutating axis of said load brushes, and means for varying the energization of said other field winding in accordance with changes in the position of said torque motor.

13. In an automatic speed regulating system for a rotary machine, means for producing a direct potential difference whose magnitude is proportional to the degree of departure of the speed of said machine from a predetermined value and whose polarity is dependent on the sign of said departure, means including a reversible torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, anti-hunting means comprising a winding in series with the load brushes of said direct current generator arranged to send flux through the armature thereof in a direction parallel to the commutating axis of said load brushes, another field winding on said direct current generator arranged to send flux through the armature thereof parallel to the commutating axis of said load brushes, and means for energizing said other field winding in accordance with the rate of change of current through said load brushes.

14. In an automatic speed regulating system for a rotary machine, means for producing a direct potential difference whose magnitude is proportional to the degree of departure of the speed of said machine from a predetermined value and whose polarity is dependent on the sign of said departure, means including a reversible torque motor for adjusting the power output of said machine, a direct current generator having an armature provided with a set of load brushes connected to said torque motor and a set of short circuited brushes whose commutating axis is electrically in quadrature with the commutating axis of said load brushes, a field winding on said generator for sending flux through said armature in a direction parallel to the commutating axis of said load brushes, means for energizing said control field winding in accordance with said potential difference, anti-hunting means comprising a winding in series with the load brushes of said direct current generator arranged to send flux through the armature thereof in a direction parallel to the commutating axis of said load brushes, another field winding on said direct current generator for sending flux through the armature thereof in a direction parallel to the commutating axis of said load brushes, and means for varying the energization of said other field winding in accordance with changes in the angular position of said torque motor.

15. In an automatic speed regulating system for a rotary machine, means for producing a direct potential difference whose magnitude is proportional to the degree of departure of the speed of said machine from a predetermined value and whose polarity is dependent on the sign of said departure, means including a reversible torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, another field winding on said direct current generator arranged to send flux through the armature thereof parallel to the commutating axis of said load brushes, means for energizing said other field winding in accordance with the rate of change of current through said load brushes, a third field winding on said direct current generator for sending flux through the armature thereof in a direction parallel to the commutating axis of said load brushes, and means for varying the energization of said third field winding in accordance with changes in the angular position of said torque motor.

16. In an automatic speed regulating system for a rotary machine, means for producing a direct potential difference whose magnitude is proportional to the degree of departure of the speed of said machine from a predetermined value and whose polarity is dependent on the sign of said departure, means including a reversible torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, means for energizing said control field winding in accordance with said potential difference, anti-hunting means comprising a winding in series with the load brushes of said direct current generator arranged to send flux through the armature thereof in a direction parallel to the commutating axis of said load brushes, another field winding on said direct current generator arranged to send flux through the armature thereof parallel to the commutating axis of said load brushes, means for energizing said other field winding in accordance with the rate of change of current through said load brushes, a fourth field winding on said direct current generator for sending flux through the armature thereof in a direction parallel to the commutating axis of said load brushes, and means for varying the energization of said fourth field winding in accordance with changes in the angular position of said torque motor.

17. In an automatic speed regulating system for a rotary machine, means for producing a direct potential difference whose magnitude is proportional to the degree of departure of the speed of said machine from a predetermined value and whose polarity is dependent on the sign of said departure comprising a pair of differentially connected pilot generators driven at a speed proportional to the speed of said rotary machine, one of said pilot generators being self-excited and the other of said pilot generators being separately-excited, and means responsive to the magnitude and sign of said potential difference for controlling the speed of said rotary machine.

18. In an automatic speed regulating system for a rotary machine, means for producing a direct potential difference whose magnitude is proportional to the degree of departure of the speed of said machine from a predetermined value and whose polarity is dependent on the sign of said departure comprising a pair of differentially connected pilot generators driven at a speed proportional to the speed of said rotary machine, one of said pilot generators being self-excited and the other of said pilot generators being separately-excited, means for adjusting the excitation of one of said machines relative to that of the other, and means responsive to said potential difference for regulating the speed of said rotary machine.

19. In an automatic speed regulating system for a rotary machine, means for producing a direct potential difference whose magnitude is proportional to the degree of departure of the speed of said machine from a predetermined value and whose polarity is dependent on the sign of said departure comprising a pair of differentially connected pilot generators driven at a speed proportional to the speed of said rotary machine, one of said pilot generators being self-excited and the other of said pilot generators being separately-excited, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, and means for energizing said control field winding in accordance with said potential difference.

20. In an automatic speed regulating system for a rotary machine, means for producing a direct potential difference whose magnitude is proportional to the degree of departure of the speed of said machine from a predetermined value and whose polarity is dependent on the sign of said departure comprising a pair of differentially-connected pilot generators driven at a speed proportional to the speed of said rotary machine, one of said pilot generators being self-excited and the other of said pilot generators being separately-excited, means for adjusting said predetermined value of speed at which said potential difference reverses its sign comprising a field rheostat for one of said pilot generators, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, and means for energizing said control field winding in accordance with said potential difference.

21. In an automatic speed regulating system for a rotary machine, means for producing a direct potential difference whose magnitude is proportional to the degree of departure of the speed of said machine from a predetermined value and whose polarity is dependent on the sign of said departure comprising a pilot generator and a potentiometer connected in series opposition, means including a torque motor for adjusting the power output of said machine, a direct current generator having an armature provided with a set of load brushes connected to said torque motor and a set of short circuited brushes whose commutating axis is electrically in quadrature with the commutating axis of said load brushes, a control field winding on said generator for sending flux through said armature in a direction parallel to the commutating axis of said load brushes, and means for energizing said control field winding in accordance with said potential difference.

22. In combination, a plurality of parallel-connected synchronous generators, separate prime movers for each of said generators, each of said prime movers being provided with a throttle, means including a rotary device for moving all of said throttles in unison while maintaining their relative positions the same, a mechanical differential having three relatively rotatable members, one of said rotatable members being connected to drive said rotary device, means for adjusting the no-load speed setting of said prime movers comprising manually operable means for driving another of said rotatable members, an electric torque motor for driving the remaining one of said rotatable members, a synchronous motor connected to be energized by said synchronous generators, a pair of differentially-connected direct current generators driven by said synchronous motor, said direct current generators having intersecting voltage-speed characteristics, means controlled by said manually operable means for adjusting the voltage of one of said differentially-connected generators relative to that of the other so that their voltage difference is substantially zero when the speed of said prime movers corresponds to the speed setting of said manually operable means, electrical amplifying means having an input circuit energized in accordance with the voltage difference of said pilot generators and having an output circuit for energizing said torque motor, and anti-hunting means for said amplifying means.

23. In combination, a plurality of parallel connected synchronous generators, separate prime movers for each of said generators, each of said prime movers being provided with a throttle, means including a rotary device for moving all of said throttles in unison while maintaining their relative positions the same, said device having a pair of driving members, means for adjusting the no-load speed setting of said prime movers comprising manually operable means for operating one of said driving members, an electric torque motor for operating the other of said driving members, separate direct current pilot generators driven by each of said engines, a circuit to which all of said pilot generators are connected in parallel, means controlled by said manually operable means for producing an adjustable unidirectional potential in said circuit to which said pilot generators are connected in parallel of a value substantially equal and opposite to the voltage of said circuit when the average speed of said prime movers is substantially the same as the speed setting produced by said manually operable means, and electrical amplifying means having an input circuit connected to be energized in accordance with the voltage difference of said pilot generators and of said last-mentioned means and having an output circuit for energizing said torque motor.

24. In a remote control system for a plurality of parallel-connected prime-mover dynamo plants, a common manual controller for simultaneously setting the no-load speed of said prime movers from full speed to quarter speed, an automatic master regulator which maintains at different loads the speed set by said master controller, and individual manual controllers for each engine for adjusting the division of load between said engines.

25. In an electric ship propulsion system, a plurality of relatively widely separated parallel-connected polyphase synchronous generators each of which is directly driven by a closely coupled individual Diesel engine, and a remote centralized electrical control system therefor comprising individual electroresponsive means for operating the respective throttles of said engines, a control station, a master control circuit therein, separate branch circuits leading therefrom for interconnecting said master circuit and the respective electroresponsive throttle operating means, a manually operated controller associated with said common circuit for simultaneously operating all of said electroresponsive devices to set the speed of all of said engines, an automatic master controller associated with said common circuit for simultaneously operating all of said electroresponsive devices in response to variations from a predetermined value of a function of the speed of all of said engines in such a manner as to restore it to said value, means interconnecting said manual and automatic controllers for causing the speed held by said automatic controller to correspond to the speed setting of said manual controller, and individual manually operated controllers associated with each of said branch circuits in said control station for adjusting the division of load between said engines.

26. A control system for a plurality of parallel-connected prime-mover-driven alternators comprising, in combination, a separate polyphase telemetric receiver for operating the throttle of each engine, a master polyphase telemetric transmitter connected to a common circuit to which all of said receivers are connected in parallel, a master phase shifter serially connected in said common circuit, manually controlled means for operating one of said master devices so as to adjust simultaneously the speed of said engines, automatic means responsive to departures of the speed of said engines from the value set by said manually controlled means for operating the other master device in a manner to cause the speed and return to said value, and manually operable individual phase shifters serially connected respectively with each of said receivers for adjusting the division of load between said engines.

ERNST F. W. ALEXANDERSON.